Sept. 25, 1962
F. J. WENNERBERG
METHOD FOR CONTINUOUS HEAT-TREATMENT
OF LIQUIDS SENSITIVE TO HEAT
Filed Dec. 8, 1958
3,055,644
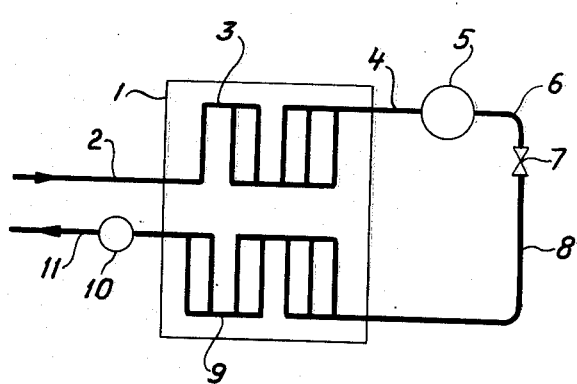
INVENTOR
Fritz Johan Wennerberg
BY
Davis, Hoxie, Faithfull & Hapgood
ATTORNEYS

United States Patent Office 3,055,644
Patented Sept. 25, 1962

3,055,644
METHOD FOR CONTINUOUS HEAT-TREATMENT OF LIQUIDS SENSITIVE TO HEAT
Fritz Johan Wennerberg, Lund, Sweden, assignor to Aktiebolaget Separator, Stockholm, Sweden, a corporation of Sweden
Filed Dec. 8, 1958, Ser. No. 778,921
Claims priority, application Sweden Dec. 9, 1957
4 Claims. (Cl. 257—272)

This invention relates to the heat treatment of heat-sensitive liquids and has particular reference to an improved method for this purpose.

It is known to pasteurize or sterilize liquids sensitive to heat, such as milk or fruit juices, by boiling off steam from the liquid at a temperature below the temperature detrimental to the liquid, this being effected continuously in an expansion vessel from the bottom of which the liquid is discharged while the steam is discharged from the top of the vessel. The discharged steam is compressed and fed again into the liquid, which is thereby heated to the desired temperature, whereupon the liquid is rapidly cooled by passing it through a pressure reducing valve under simultaneous steam generation. The advantage of this method is that by supplying steam at a relatively high pressure, the liquid can be brought rapidly up to sterilizing temperature and then cooled rapidly by boiling off steam at reduced pressure. In this way, the liquid can be kept for a very short time above the detrimental temperature and thus sterilized without any appreciable damage to the liquid. More particularly, this method prevents the liquid from becoming "cooked" onto the superheated surfaces of a heat exchanger and thereby acquiring a burned or cooked taste.

The present invention makes it possible to effect continuous heat-treatment of liquids sensitive to heat without the above-mentioned expansion vessel, thereby rendering the treating plant less expensive. According to the invention, the liquid is first heated to and partly vaporized at a temperature below the temperature detrimental to the liquid, and the mixture formed, consisting of liquid and vapor bubbles without being separated into its components, is then passed directly to a compressor where it is compressed to such a pressure that the vapor in the mixture is condensed. The liquid thus heated by the condensation and compression of the vapor is then rapidly cooled down, by pressure reduction with concomitant boiling off of vapor, to a temperature below the detrimental temperature.

The method of the invention also has the advantage that the liquid-steam mixture is heated, during the compression only to the sterilizing temperature. If only the steam is compressed instead, as in the usual practice, there will be either a superheating of the steam which puts a strain on the compressor and causes undesirable superheating of individual milk particles, or else the compressor must be cooled. The cooling is in itself a cost-increasing complication, and it means, moreover, that the energy (generated in a relatively expensive way) is not utilized. In the present method, on the other hand, the steam starts condensing in the milk successively and, consequently, at an early stage of the compression, whereby the power consumption of the compressor is reduced.

It is in many cases desirable that the liquid be heated and subjected to a vacuum before the first vaporization, so that gases dissolved in the liquid are removed (dearation and deodorization). The heating and the cooling at temperatures below the detrimental temperature may be carried out to advantage in conventional heat exchangers. Dilution or concentration of the liquid can take place by supplying to it, during the heat-treatment, vapor from without, or by leading away from it vapor that has been generated from the liquid.

The apparatus for carrying out the new method preferably comprises a heater and a cooler, each provided with an inlet and an outlet, a pipe connecting the outlet of the heater to the inlet of the cooler, a compressor inserted in the pipe, and a pressure reduction valve inserted in the pipe between the compressor and the inlet of the cooler. The heater may constitute the primary side and the cooler the secondary side of a heat exchanger.

It is desirable that the vapor bubbles formed in the liquid on the primary side of the heat exchanger should not be given the chance to separate from the liquid before the mixture of liquid and vapor bubbles is supplied to the compressor. For this purpose, I prefer to use a plate heat exchanger in which the heat-receiving chambers on the primary side are connected in parallel groupwise, and the chamber groups are, in turn, connected in series reciprocally. As more vapor is generated, the longer the path of the liquid flow on the primary side of the heat exchanger, and as this vapor requires a corresponding space, the volume of the chamber groups can be increased in the direction towards the outlet of the primary side. In a similar manner, the chamber groups on the secondary side can be connected and have a volume diminishing towards the outlet. If desired, all chambers on this side can be connected in parallel.

The invention is described below in more detail with reference to the attached drawing showing, diagrammatically and by way of example, a plant for carrying out the new method.

In the following description, it is assumed for illustrative purposes that the liquid to be sterilized is milk, that temperatures above 70 to 75° C. are detrimental to the milk and that the sterilization is to take place at 150° C.

In the drawing, the reference numeral 1 denotes a plate heat exchanger. The milk, pre-heated to about 65° C., enters the primary side 3 or heating zone of the heat-exchanger through a pipe 2. As indicated diagrammatically, the primary side 3 is divided into groups of chambers connected in parallel, the number of chambers in the groups increasing towards the outlet 4. This opens into a compressing zone or compressor 5 whose suction side maintains such a vacuum on the primary side of the heat exchanger that the temperature there remains at about 65° C. This means that practically all the heat supplied to the primary side is consumed for generating steam with a temperature of 65° C. The heat supplied is calculated to give steam in the amount of 14% of the weight of the milk.

The mixture of milk and steam bubbles discharging through the outlet 4 is compressed by the compressor 5 to such a pressure that substantially all the steam is condensed. This means that the condensation heat of the steam successively heats the milk further as the compression proceeds. As a result of the additional heat which the condensation and the compressing action provide, the milk in the pipe 6 attains a temperature of 150° C.

From compressor 5, the milk passes through a pressure reducing valve 7 whereby about 14% by weight of steam is developed in the pipe 8 or expansion zone at a temperature of about 70° C. The milk and steam from pipe 8 enter the secondary side 9 of the heat exchanger 1, where the steam is condensed by emitting heat to the primary side 3. The milk is then sucked out by a pump 10 through the outlet 11 of the secondary side.

Preferably, other plate heat exchangers (not shown) are used for heating the milk before it enters the primary side 3 and for cooling the milk after it leaves the secondary side 9.

I claim:
1. In the continuous heat treatment of a heat-sensitive liquid which is normally in the liquid state, the method which comprises feeding the liquid continuously to a heating zone and there heating the liquid to and partly vaporizing it at a predetermined temperature, thereby forming a mixture of liquid and vapor bubbles distributed in the liquid continuously feeding said mixture, while said vapor bubbles are mixed with remaining liquid directly to a compressing zone and there compressing the mixture to a pressure sufficient to condense the vapor in the mixture, thereby heating the liquid, then feeding the liquid continuously from said compressing zone to a cooling zone and there rapidly cooling the liquid to a temperature below said predetermined temperature, and continuously discharging said liquid from said cooling zone and from the process, whereby the heat-treated liquid so discharged has substantially the same composition as the liquid fed to said heating zone.

2. The method according to claim 1, comprising also the steps of heating the liquid and subjecting it to a vacuum to remove dissolved gases therefrom, prior to said vaporizing.

3. The method according to claim 1, in which said cooling of the liquid is effected by reduction of pressure on the liquid with concomitant boiling off of vapor, the method comprising also the steps of condensing the vapor developed by said pressure reduction and discharging the resulting condensate with the liquid.

4. The method according to claim 1, in which said cooling of the liquid is effected by reduction of pressure on the liquid with concomitant boiling off of vapor, the method comprising also the step of passing the liquid and vapor from said pressure reduction into heat exchange relation to the liquid undergoing said first heating in said heating zone, thereby condensing the vapor from said pressure reduction.

References Cited in the file of this patent

UNITED STATES PATENTS

| | | |
|---|---|---|
| 1,150,713 | Soderlund | Aug. 17, 1915 |
| 1,914,604 | Keenan et al. | June 20, 1933 |
| 2,302,469 | Patterson | Nov. 17, 1942 |
| 2,575,325 | Ambrose et al. | Nov. 20, 1951 |
| 2,703,610 | Cross | Mar. 8, 1955 |